(12) United States Patent
Verma et al.

(10) Patent No.: US 11,520,734 B2
(45) Date of Patent: Dec. 6, 2022

(54) DEVICE TO DEVICE MIGRATION IN A UNIFIED ENDPOINT MANAGEMENT SYSTEM

(71) Applicant: VMWARE, INC., Palo Alto, CA (US)

(72) Inventors: Gaurav Verma, Bangalore (IN); Manjunath Subramani, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 236 days.

(21) Appl. No.: 16/876,175

(22) Filed: May 18, 2020

(65) Prior Publication Data

US 2021/0286758 A1 Sep. 16, 2021

(30) Foreign Application Priority Data

Mar. 16, 2020 (IN) .............................. 202041011221

(51) Int. Cl.
| | | |
|---|---|---|
| *G06F 16/11* | (2019.01) | |
| *G06F 16/182* | (2019.01) | |
| *G06F 8/65* | (2018.01) | |
| *G06F 21/60* | (2013.01) | |
| *G06F 21/31* | (2013.01) | |
| *G06F 21/62* | (2013.01) | |

(52) U.S. Cl.
CPC .............. *G06F 16/119* (2019.01); *G06F 8/65* (2013.01); *G06F 16/182* (2019.01); *G06F 21/31* (2013.01); *G06F 21/602* (2013.01); *G06F 21/6218* (2013.01)

(58) Field of Classification Search
None
See application file for complete search history.

(56) References Cited

U.S. PATENT DOCUMENTS

| | | | |
|---|---|---|---|
| 10,361,843 B1 * | 7/2019 | Suthar | .................... H04L 9/3297 |
| 11,240,292 B2 * | 2/2022 | Cassidy | .............. H04L 67/1097 |
| 2013/0212200 A1 * | 8/2013 | Dennis | ................ H04L 67/1095 |
| | | | 709/206 |
| 2018/0145887 A1 * | 5/2018 | Deane | ................. H04L 41/5054 |
| 2018/0336363 A1 * | 11/2018 | Algie | ....................... H04L 9/085 |
| 2021/0258368 A1 * | 8/2021 | Cassidy | .................. H04L 67/06 |
| 2022/0124142 A1 * | 4/2022 | Cassidy | .................. G06F 3/067 |

* cited by examiner

*Primary Examiner* — Kim T Nguyen
(74) *Attorney, Agent, or Firm* — Clayton, McKay & Bailey, PC (57) ABSTRACT

Described herein are example methods and systems for enrolling a user device with an unified endpoint management system ("UEMS") directly from another user device. The examples describe a first user device that is already enrolled with the UEMS and a second user device that is seeking to be enrolled. The two user devices can establish a direct connection with each other. The second user device can be authenticated by a user inputting the same migration password or pin at both user device. The first user device can generate and send a migration data file to the second user device. The migration data file can include settings, policies, software packages, and files managed by the UEMS. The second user device can copy settings, policies, and files, and install the applications from the migration data file. The second user device can notify an UEMS server of the device migration.

17 Claims, 4 Drawing Sheets

DEVICE TO DEVICE MIGRATION IN A UNIFIED ENDPOINT MANAGEMENT SYSTEM

RELATED APPLICATIONS

Benefit is claimed under 35 U.S.C. 119(a)-(d) to Foreign Application Serial No. 202041011221 filed in India entitled "DEVICE TO DEVICE MIGRATION IN A UNIFIED ENDPOINT MANAGEMENT SYSTEM" on Mar. 16, 2020, by VMWARE, Inc., which is herein incorporated in its entirety by reference for all purposes.

BACKGROUND

Unified Endpoint Management ("UEM") systems allow corporations to manage work-related applications and data on enrolled user devices. Users can enroll their own devices, such as cell phones, tablets, or laptops. Enrollment can include installing managed applications and other resources on the user device.

With continuous changes in mobile and computing technology and frequent changes in hardware capability, users in a UEMS environment frequently change and upgrade their computing devices. Some users use multiple devices, such as a phone, a tablet and a personal computer, that they regularly upgrade. Each time a user acquires a new device to use in the UEMS environment, that device must be enrolled and install all the necessary UEMS software.

Currently, devices are configured by interacting with an enrollment server and fetching all the resources from the server. Keeping up with the demand for enrolling new devices and installing all the corporate data can be a tedious and time-consuming job for administrators. It can also put a strain on networks and servers as files and applications are downloaded.

As a result, a need exists for a system that can enroll new user devices in a UEMS environment while reducing reliance on servers, networks, and administrator actions.

SUMMARY

Examples described herein include systems and methods for a device to device unified endpoint management system ("UEMS") migration. In one example, a direct connection can be established between two user devices. The first user device can be enrolled in a UEMS and the second device can be seeking to enroll in the UEMS. In an example, each of the user devices can have a portal application installed thereon that can manage enrollment of the second device with the UEMS.

In an example, a user, using the portal application on the first or second user device can select to enroll the second user device by migrating the first user device directly to the second device. Based on the selection, both user devices can prepare for the migration. For example, the first user device can prompt the user for a migration password or pin that can be utilized to authenticate the second user device. The second user device can prepare to receive a direct connection request from the first user device. For example, the second user device can make itself discoverable to the first user device via wireless communication such as WIFI or BLUETOOTH.

In an example, after the direct connection has been successfully established, the first user device can send the migration password to the second user device in encrypted format. The first user device can also send an encryption key so that the second user device can decrypt the password and authenticate the user for the device migration. Consequently, the second user device can receive and decrypt the migration password or pin, and then prompt the user to input the same password or pin.

Once the user has authenticated, the second user device can indicate to the first user device which operating system is running on the second user device. The first user device can then generate a migration data file. In an example, the contents of the migration data file may depend on whether or not the user devices are running the same operating system. In examples where the user devices are running the same operating system, the migration data file can include all files, UEMS policies, and software packages for all UEMS managed applications installed on the first user device. In examples where the user devices are not running the same operating system, the migration data file can include all files and UEMS policies managed by the UEMS, but instead of software packages, the migration data file can include a list of UEMS managed applications installed on the first user device. Once the migration data file is created, the first user device can transmit it to the second user device via the established direct connection.

In an example, after receiving the migration data file, the second user device can initiate the device migration. This can include, for example, first verifying the integrity of the migration data file. Some example methods of integrity verification can include utilizing an encryption key, a hash, or a cryptographic hash. Once the file integrity has been verified, the second user device can apply profile settings and UEMS policies to the second user device. The UEMS polices can ensure the second user device is compliant before accessing UEMS resources.

The second user device can also extract and execute a software package from the migration data file. Executing the software package can cause the second user device to install an application. In an example, the application can be an UEMS-managed application. The second user device can do this for all software packages included in the migration data file. The second user device can also copy data files from the migration data file using the same file structure as the first user device.

In an example, once all settings, policies, applications, and files have been successfully installed on the second user device, the second user device can notify the first user device and the direct connection between the user devices can be terminated. After termination, in an example, the second user device can then connect to the UEMS network and communicate with an UEMS server to notify the server of the successful device migration. In some examples, this notification may be the only part of the device migration process that involves UEMS networks and servers.

In an additional example, the first user device can prompt a user to decide what should happen to the first user device after successful migration and enrollment of the second user device. For example, the first user device can prompt a user in a GUI to choose between keeping the first user device enrolled in the UEMS or unenrolling it. In an example where the user chooses to unenroll, the first user device can erase all settings, policies, applications, and files managed by the UEMS.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Described herein are example methods and systems for enrolling a user device with an unified endpoint management system ("UEMS") directly from another user device. In one example, a first user device that is already enrolled with the UEMS can assist with enrolling a second user device that seeks enrollment. The two user devices can establish a direct connection with each other. In one example, the second user device can be authenticated by a user inputting the same migration credentials at both user devices. The migration credentials can include a PIN, password, fingerprint, or facial recognition, in an example.

In an instance where migration is successful, the first user device can generate and send a migration data file to the second user device. The migration data file can be one or more files. When the user devices are running the same operating system ("OS"), the migration data file can include settings, policies, software packages, and files managed by the UEMS. The second user device can copy settings, policies, and files, and install the applications from the migration data file. The second user device can notify an UEMS server of the device migration. In examples where the user devices are not running the same OS, the migration data file can include a list of applications installed on the first user device instead of their software packages. In these examples, the second user device can download the applications in the list from a UEMS server.

Figure 1:
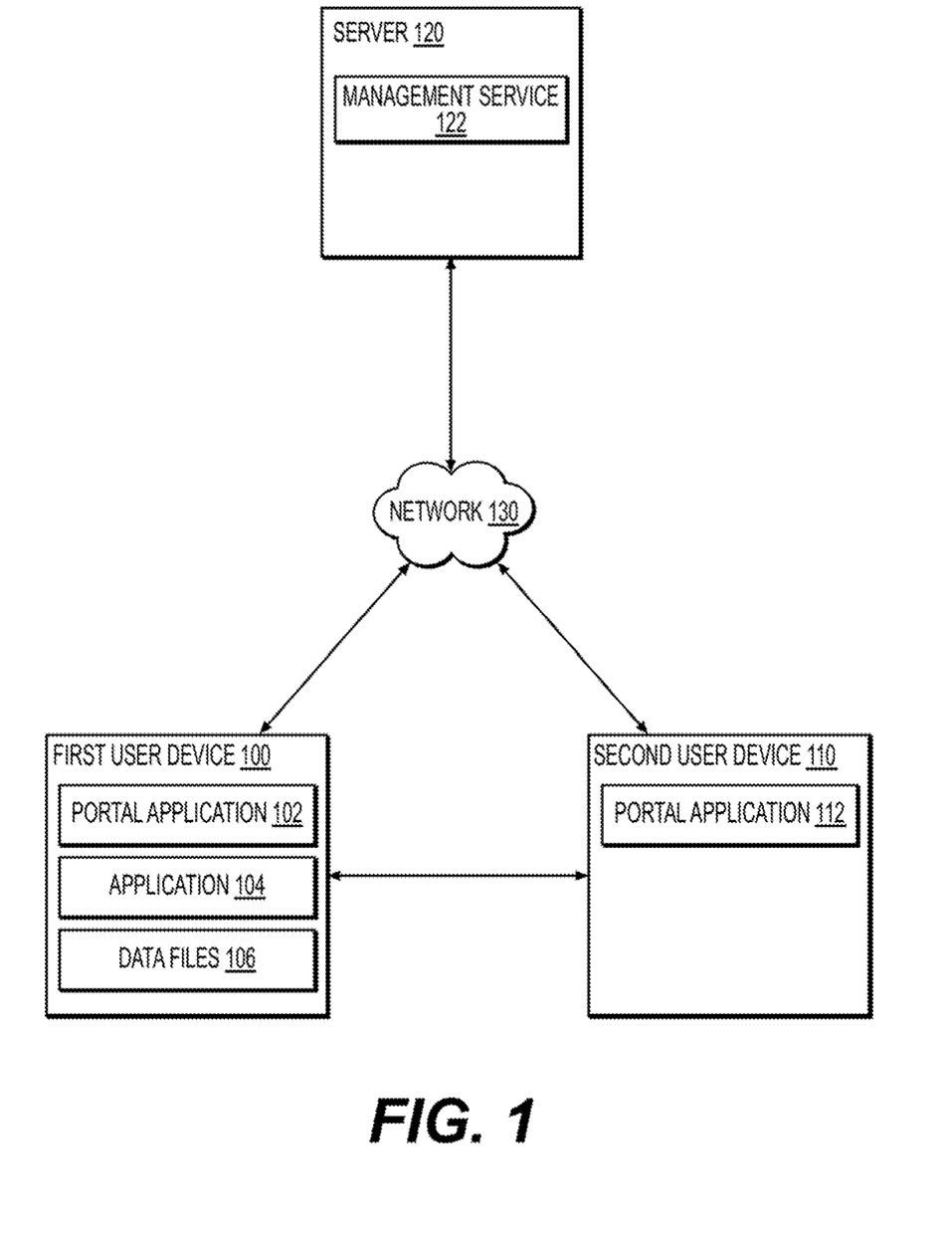
FIG. 1 is an illustration of an example system for performing device to device UEMS migration.

FIG. 1 is an illustration of a system for performing device to device UEM that includes a first device 100, a second device 110, and a server 120. The first and second devices 100, 110 can be user devices, such as phones, laptops, or tablets. In one example, both the first and second device 100, 110 can be owned or assigned to the same user. First device 100 and second device 110 can each include an instance of a portal application 102 and 112 respectively. First device 100 can also include application 104 and data files 106. The portal application 102, 112 can operate as part of the UEMS, allowing enrolled devices to be managed by a management server, such as server 120.

First device 100 and second device 110 can be processor-based devices, such as a personal computer, tablet, or cell phone. First device 100 can be enrolled with an UEMS. For example, some UEMS environments can require enrollment with a management system in order to access UEMS resources. In an example, portal application 102 can assist in the enrollment and management process by communicating with a management service 122 of server 120—such as by exchanging tokens—obviating the need to download a management-dedicated application, such as an agent application. Server 120 can be a single server or a group of servers, including multiple servers implemented virtually across multiple computing platforms.

After enrolling first device 100 with a management service 122 through portal application 102, management service 122 can provide portal application 102 with an authorization certificate or token ("authorization certificate"). In some examples, when portal application 102 requests access to UEMS resources from server 120, portal application 102 can provide the authorization certificate, which verifies that the user device is authorized to access the UEMS resources.

Application 104 can be a managed application, in an example. A managed application can allow a UEMS to control access and functionality of the application. Data files 106 can be files that are managed by an UEMS through portal application 102, such as application files, UEMS policy files, and user files. Additionally, a managed application can persist locally on the user device or can be accessed from within the portal application, depending on the example. Even when an application is accessed remotely, portions of that application or data utilized by the application can exist locally on the user device. Local resources can be encrypted and decrypted for use by the portal application 102, managed application, or some other process of the UEMS.

Some EMM systems may allow users to enroll their personal user devices. In such instances, a user device may include both managed and non-managed applications and data files. Portal application 102 can be configured to catalog application 104 and data files 106 so that it is aware of the applications and files managed by the UEMS. The portal application 102 can provide either local or remote access to these managed resources.

Prior to a device to device UEMS migration, a user can install portal application 112 on second device 110. Portal applications 102 and 112 can be configured to communicate with each other to execute a device to device UEMS migration using the example methods described later herein. To execute a device to device UEMS migration, first device 100 and second device 110 should be able to communicate directly with each other. In some examples, first device 100 and second device 110 can communicate directly over WIFI or BLUETOOTH. First device 100 and second device 110 can also communicate with server 120 by connecting to network 130. In an example, network 130 can be a UEMS network of which server 120 is a part. Network 130 can also include the internet, in an example.

Figure 2:
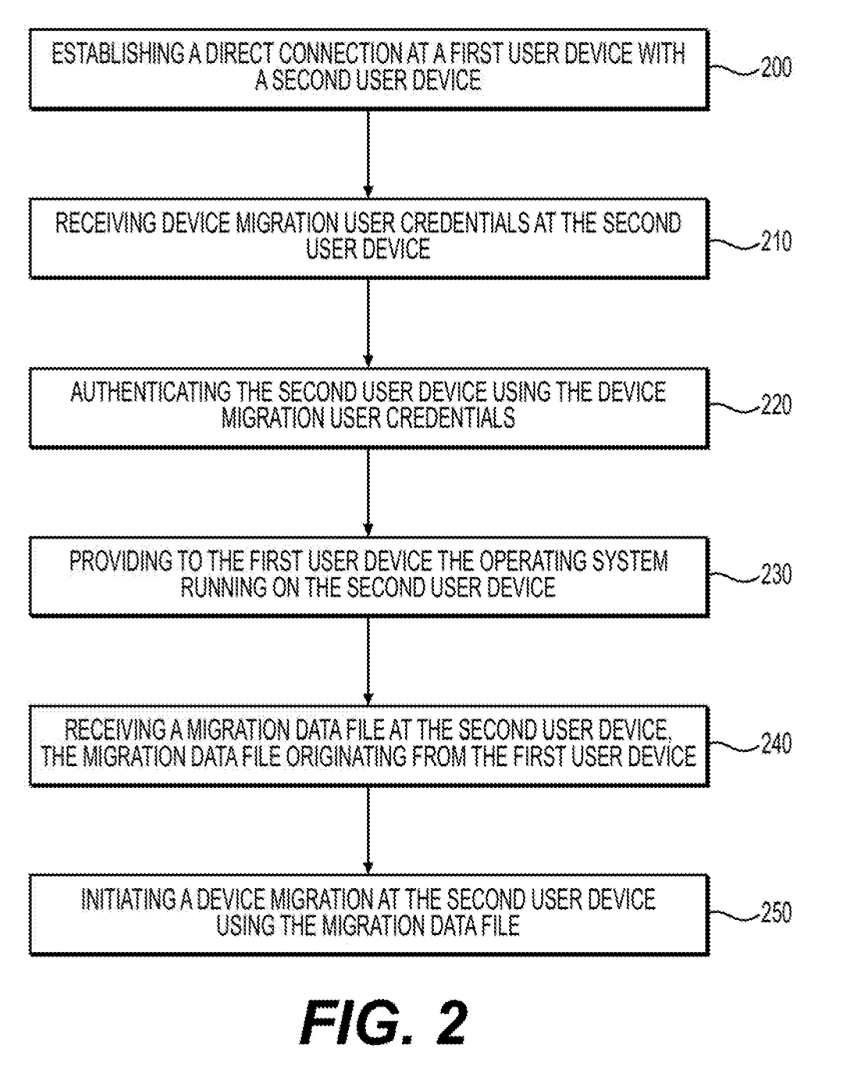
FIG. 2 is a flowchart of an example method for device to device UEMS migration.

FIG. 2 is a flowchart of an example method for device to device UEMS migration. At stage 200, first device 100 can establish a direct connection with second device 110. The direct connection can be established using WIFI or BLUETOOTH, for example. In an example, the direct connection can be established in response to a user initiating a device migration. For example, portable application 102 can include an option for direct device to device migration, and portal application 112 can include an option to receive a direct device to device migration. A user can select these options on both devices, in an example. In response to this selection, first device 100 can search for second device 110 to establish a direct connection. Alternatively, the second device 110 can search for the first device 110. Portal application 112 can cause second device 110 to prepare to receive a direct connection request from first device 100. The two devices 100, 110 can then establish the direct connection.

At stage 210, second device 110 can receive device migration user credentials. As an example, portal application 102 can prompt a user to enter a device migration password or pin at first device 100. After the direct connection is established, first device 100 can encrypt the password or pin and send it, along with an encryption key, to second device 110. Other credentials, such as a fingerprint or facial recognition, can be used in another example. At stage 220, second device 110 can authenticate using the device migration user credentials. For example, portal application 112 can prompt a user to input the device migration password or pin. Portal application 112 can unencrypt the password or pin using the encryption key and verify the user input password or pin.

At stage 230, second device 110 can indicate to first device 100 the OS running on second device 110. Various OSs are used on computing devices. Some examples include MacOS, IOS, ANDROID, WINDOWS, and LINUX. Software applications must be programmed to operate on an OS, and an application programmed on one OS usually will not be able to run on another OS. For example, an IOS version of an application cannot be installed on an ANDROID device. For this reason, files that can be transferred in a device to device migration will depend on whether or not first device 100 and second device 110 are operating on the same OS. In one example, if the OSs match, all UEMS files, including software packages, can be transferred. In another example, if the OSs do not match, then non-software package files can be transferred.

At stage 240, second device 110 can receive a migration data file from first device 100. The migration data file can include all files involved in the device to device migration. For reasons explained above, the files included in the migration data file may depend on whether the OSs of first device 100 and second device 110 match. Some files can be included in the migration data file regardless of the OSs. For example, certain file types, such as emails, text documents, and messages, can be read by different applications or the same application installed on different OSs. The migration data file can also include UEMS policy rules.

In an example where the OSs match, the migration data file can include software packages for all UEMS-managed applications on first device 100. For example, the migration data file can include a software package for application 104. A software package can include the files required to install application 104 on second device 110, such as an .exe file for a WINDOWS OS device, an .apk file for an ANDROID OS device, and an .ipa file for an IOS device. The migration data file can also include additional files related to the software package, such as files relating to user accounts and personal settings. In an example, these files can be data files 106.

In an example where the OSs do not match, instead of the software packages, the migration data file can include a list of UEMS-managed applications that are installed on first device 100. In one example, the list can be a text-based list that a user can read to then manually install the applications on second device 110. In another example, the list can be readable by portal application 112 such that portal application 112 can cause second device 110 to query server 120 to retrieve the software packages for the listed applications.

At stage 250, second device 110 can execute the device migration. Executing the device migration can include actions such as extracting software packages from the migration data file to install applications, extracting and copying data files, and applying profiles settings and UEMS policies. In an example, the device migration can be executed by portal application 112.

Figure 3:
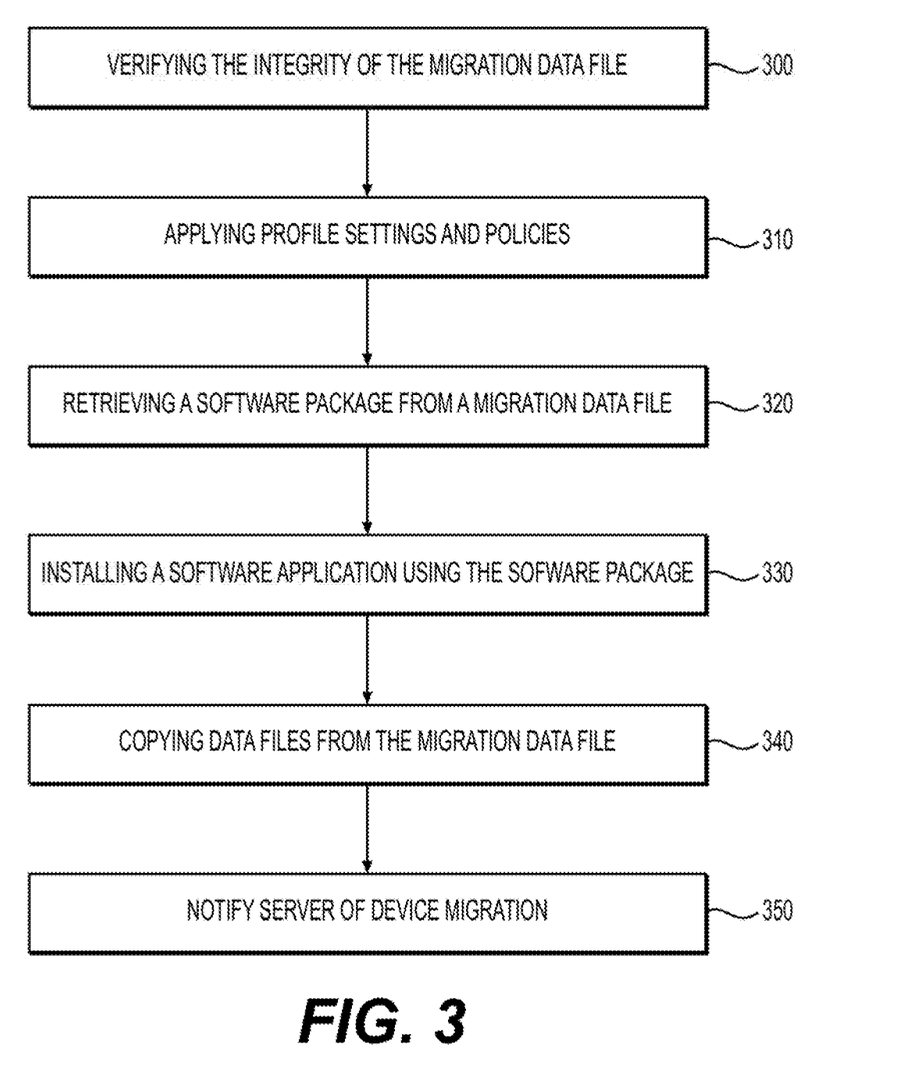
FIG. 3 is a flowchart of an example method for a user device executing a migration in a device to device UEMS migration.

FIG. 3 is a flowchart of an example method for second device 110 executing a device migration. At stage 300, second device 110 can verify the integrity of the migration data file. The verification can be done to avoid an invalid device migration. In some examples, this can be done using an encrypted key or a hash of the file. For example, if a hash of the received migration data file matches a previously calculated value, then the file is presumed to be unmodified. In another example, a cryptographic hash function can be used for added security, which can verify that the migration file has not been tampered with by an untrusted party. Secure Hash Algorithm 2 ("SHA-2") and SHA-3 are two example cryptographic hash function protocols that can be implemented. It is contemplated that other methods of verifying file integrity not listed herein can be implemented to verify the migration data file.

In an instance where the integrity of the migration data file cannot be verified, second device 110 can inform first device 100 of the failed migration. In some examples, first device 100 can create a new migration data file and send it to second device 110 for the device migration. Second device 110 can attempt to verify the integrity of the new file. If the verification is successful, second device 110 can proceed to stage 310. Otherwise, second device 110 can be prohibited from executing the device migration. In an example, portal application 112 can manage the file verification process and device migration permissions.

In some examples where the migration data file cannot be verified, first device 100 and second device 110 can execute a device migration as if the two devices operate using different OSs. For example, first device 100 can create a new migration data file with only non-software data files, such as profile settings and UEMS policies, and an application list of all managed applications installed on first device 100. Second device 110 can attempt to verify the new non-software data file. If verification is successful, second device 110 can apply profile settings and UEMS policies. Second device 110 can then authenticate with server 120 and proceed to download software package files from server 130 that correspond to the applications listed in the new migration data file. If authenticating the new migration data file is unsuccessful, then the UEMS may prohibit second device 110 from migrating via device to device migration.

In some examples where the verification of the new migration data file fails, second device 110 can retrieve the data files from server 120. In these examples, server 120 may store a backup of the data files from first device 100. The device migration authentication described in stage 220 above can be sufficient to verify to the UEMS that second device 110 is authorized for device migration. In other examples where the verification of the new migration data file fails, the UEMS may not allow second device 110 to enroll with the UEMS without approval from an administrator.

At stage 310, second device 110 can apply profile settings and UEMS policies. In an example, UEMS policies can be security policies managed and enforced by management service 122 on server 120. In another example, server 120 can enforce UEMS polices through portal application 122. For example, portal application 122 can regularly check second device 110 to ensure it is compliant with UEMS policies before allowing second device 110 to access any UEMS resources. In another example, portal application 122 can require that all policies be installed on second device 110 prior to proceeding with the device migration.

At stage 320, second device 110 can retrieve a software package from the migration data file. A software package can include the files required to install a software application, such as application 104, on second device 110. The software package can be one or multiple software packages. In an example, the software package can be for an application managed by an UEMS. At stage 330, second device 110 can install software application 104 from the software package. By installing application 104 from the software package in the migration data file, second device 110 can install application 104 without needing to contact server 120 to download the software package. All UEMS-managed applications installed on first device 100 can therefore be migrated to second device 110 without putting any strain on server 120, network 130, or the UEMS.

At stage 340, second device 110 can copy data files from the migration data file, such as data files 106. In an example, the migration data file can include the file structure of the files on first device 100. When copying data files 106, second device 110 can mirror the file structure from first device 100. In an example, data files 106 can include all files on first device 100 that are associated with the UEMS.

At stage 350, second device 110 can notify server 120 of the device migration. In an example, after successfully installing applications and copying data files from the migration data file, second device 110 can notify first device 100, and the two devices can terminate the direct connection. In another example, second device 110 can establish a connection with server 120 by connecting to network 130. Second device 110 can notify server 120 of the successful enrollment and migration. By executing the device to device migration using the steps previously described herein, this may be the only action required by server 120, thereby freeing up server and network resources and expediting the device migration process.

Figure 4:
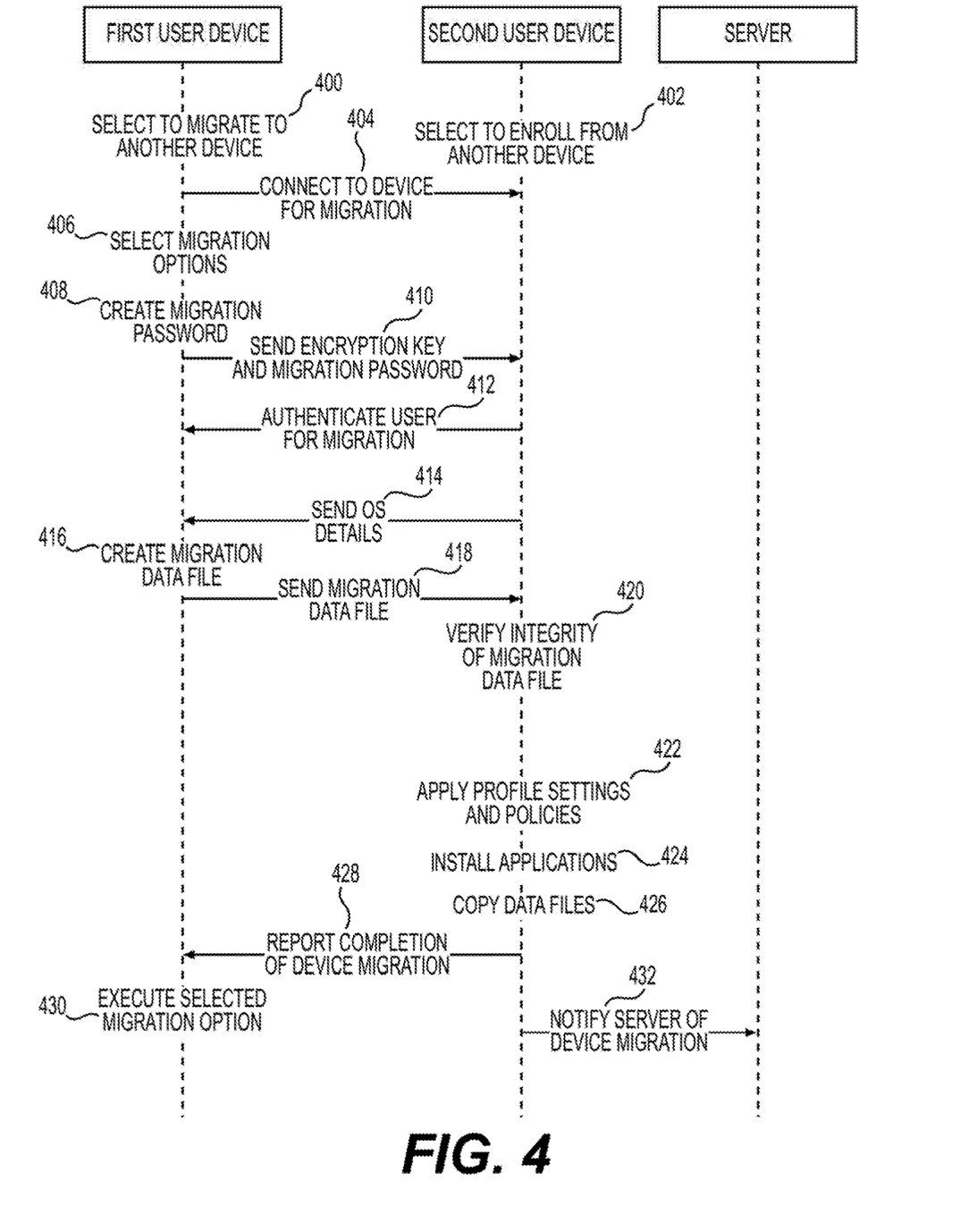
FIG. 4 is a sequence diagram of an example method for device to device UEMS migration.

FIG. 4 is a sequence diagram of an example method for device to device UEMS migration. At stage 400, first device 100 can select to migrate to another device. The selection can be user input indicating a desire to migrate. As an example, portal application 102 can manage the device migration for the part of first device 100. Portal application 102 can include an option to migrate to another device.

Likewise, at stage 402, portal application 112 on second device 110 can also include a migration option. In an example, because second device 110 is not yet enrolled in an UEMS, portal application 112 may only provide an option to enroll and receive a migration from another device. Upon receiving a selection of the option, portal application 112 can prepare second device 110 to enroll and receive a migration from another device.

At stage 404, first device 100 can connect directly to second device 110 for migration. The direct connection can be established using WIFI or BLUETOOTH for example. In an example, the direct connection can be established in response to a user initiating a device migration in stages 400 and 402. For example, upon receiving the user input, portal application 102 can cause first device 100 to search for second device 110 to establish a direct connection, and second device 110 can be prepared by portal application 112 to receive the direct connection request.

The direct connection can be established from either of the first and second device 100, 110 to the other. Likewise, the order of stages 400 and 402 can depend on the example. In one example, the user can select to enroll at stage 402 prior to selecting a migration option at stage 400. The second device 110 can attempt to directly connect to the first device 100 at stage 404. The user can accept the direct connection as part of allowing migration at stage 400, in an example.

At stage 406, first device 100 can receive a migration option selection. The migration option selection can indicate what should happen to first device 100 upon completion of the device to device migration. For example, portal application 102 can allow a user to choose between unenrolling first device 100 and keeping it enrolled. In an instance where a user selects to unenroll first device 100, upon completion of the device migration portal application 102 can wipe all applications and files from first device 100 that are associated with the UEMS.

At stage 408, first device 100 can create a migration credential, such as a migration password. As an example, portal application 102 can prompt a user to enter an authentication at the first device 100 for use at the second device 110, or vice versa. The authentication can be a device migration password or pin at first device 100. The migration password can be used to verify that second device 110 is authorized to receive the migration. First device 100 can also encrypt the migration password, or use another security protocol such as a hash or cryptographic hash, prior to sending it to second device 110.

Accordingly, at stage 410, first device 100 can send the migration password in encrypted format to second device 110. In an example, first device 100 can also send an encryption key to second device 110. At stage 412, second device can authenticate the user for migration with first device 100. This can include prompting a user for the migration password in a GUI at second device 110. Second device 110 can validate the user by decrypting the migration password and checking it against the password input by the user.

Alternatively, the migration credential used in stages 408, 410, 412 can be a fingerprint or facial recognition. The same examples apply to those types of migration credentials. In one example, the migration credential can be created at either device 100, 110 and confirmed at the other device 110, 100.

At stage 414, second device 110 can identify which OS it is running to the first device. This can include transferring details to first device 100 regarding the OS running on second device 110. The files that can be successfully transferred in a device to device migration can depend on whether or not first device 100 and second device 110 are operating on the same OS. In one example, if the OSs match, all UEMS files, including software packages, can be transferred. In another example, if the OSs do not match, then only non-software package files can be transferred and installed. For example, if first device 100 is running IOS and second device is running ANDROID, then the applications running on first device 100 cannot be installed on second device 110.

At stage 416, first device 100 can create a data migration file. The migration data file can include files involved in the device to device migration. For reasons explained above, the files included in the migration data file may depend on whether the OSs of first device 100 and second device 110 match. Some files can be included in the migration data file regardless of the OSs. For example, certain file types, such as emails, text documents, and messages, can be read by different applications or the same application installed on different OSs. The migration data file can also include UEMS policy rules. Additionally, the migration data file can be more than one file, in an example. Using multiple files as the migration data file can ensure file transfer between the devices when the direct connection has a file size limit or when intermittent connectivity causes the devices 100, 102 to retry a file transfer.

In an example where the OSs match, the migration data file can include software packages for all UEMS-managed applications on first device 100. A software package can include the files required to install a software application, such as application 104, on second device 110, such as an .exe file for a WINDOWS OS device, an .apk file for an ANDROID OS device, and an .ipa file for an IOS device. The migration data file can also include additional files related to the software package, such as files relating to user accounts and personal settings. For example, the additional files can be data files 106.

In an example where the OSs do not match, instead of the software packages, the migration data file can include a list of UEMS-managed applications that are installed on first device 100. In one example, the list can be a text-based list that a user can read to then manually install the applications on second device 110. In another example, the list can be readable by portal application 112 such that portal application 112 can cause second device 110 to query server 120 and download the applications automatically. At stage 418, first device 100 can send the migration data file to second device 110. The migration data file can be sent via the direct connection, for example.

At stage 420, second device 110 can verify the integrity of the migration data file. The verification can be done to avoid an invalid device migration. In some examples, this can be done using an encrypted key or a hash of the file. For example, if a hash of the received migration data file matches a previously calculated value, then the file is presumed to be unmodified. In another example, a cryptographic hash function can be used for added security, which can verify that the migration file has not been tampered with by an untrusted party. For example, Secure Hash Algorithm 2 ("SHA-2") and SHA-3 are two example cryptographic hash functions that can be implemented. It is contemplated that other methods of verifying file integrity not listed herein can be implemented to verify the migration data file.

In an instance where the integrity of the migration data file cannot be verified, second device 110 can inform first device 100 of the failed migration. In some examples, first device 100 can create a new migration data file and send it to second device 110 for the device migration. Second device 110 can attempt to verify the integrity of the new file, and if the verification is successful, second device 110 can proceed to stage 424. Otherwise, second device 110 can be prohibited from executing the device migration. In an example, portal application 112 can manage the file verification process and device migration permissions.

In some examples where the migration data file cannot be verified, first device 100 and second device 110 can execute a device migration as if the two devices operate using different OSs. For example, first device 100 can create a new migration data file with only non-software data files, such as profile settings and UEMS policies, and an application list of all managed applications installed on first device 100. Second device 110 can attempt to verify the new non-software data file. If verification is successful, second device 110 can proceed to stage 422 below, but skip stage 426 regarding installation of UEMS managed applications. Instead, second device 110 can connect to and authenticate with server 120, and then proceed to download software package files from server 130 that correspond to the applications listed in the new migration data file.

In some examples where the verification of the new migration data file fails, second device 110 can retrieve the data files from server 120. In these examples, server 120 may store a backup of the data files from first device 100. The device migration authentication described in stage 220 above can be sufficient to verify to the UEMS that second device 110 is authorized for device migration. In other examples where the verification of the new migration data file fails, the UEMS may not allow second device 110 to enroll with the UEMS without approval from an administrator.

At stage 422, second device 110 can apply profile and UEMS policy settings. In an example, UEMS policies can be security policies managed and enforced by management server 122 on server 120. In another example, server 120 can enforce UEMS polices through portal application 122. For example, portal application 122 can regularly check second device 110 to ensure it is compliant with UEMS policies before allowing second device 110 to access any UEMS resources. In another example, portal application 122 can require that all policies be installed on second device 110 prior to proceeding with the device migration.

At stage 424, second device 110 can install UEMS managed applications, such as application 104. In an example, installing application 104 can include retrieving a software package from the migration data file. The software packages can include the files required to install application 104 on second device 110. The software packages can be one or multiple software packages. By installing application 104 from the software packages in the migration data file, second device 110 can install application 104 without needing to contact server 120 to download the software package. All UEMS-managed applications installed on first device 100 can therefore be migrated to second device 110 without putting any strain on server 120, network 130, or the UEMS.

At stage 426, second device 110 can copy data files from the migration data file, such as data files 106. In an example, the migration data file can include the file structure of data files 106 on first device 100. When copying data files 106, second device 110 can mirror the file structure from first device 100. In an example, data files 106 can include all files on first device 100 that are associated with the UEMS.

At stage 428, second device 110 can report completion of the device migration to first device 100. In an example, upon receiving the completion report, first device 100 and second device 110 can terminate the direct connection with each other. After the direct connection has been terminated, at stage 430, first device 100 can execute the selected migration option from stage 406. For example, if a user selected to keep first device 100 enrolled, then all the files and applications remain on first device 100 and a user can continue to use first device 100 within the UEMS environment. However, if a user selected to unenroll first device 100, then portal application 102 can wipe all applications, UEMS polices, and data files on first device 100 that are managed or associated with the UEMS.

At stage 432, second device 110 can notify server 120 of the device migration. In an example, after successfully installing all applications and copying all data files from the migration data file, second device 110 can notify first device 100, and the two devices can terminate the direct connection. In another example, second device 110 can establish a connection with server 120 by connecting to network 130. Second device 110 can notify server 120 of the successful enrollment and migration. By executing the device to device migration using the steps previously described herein, this may be the only action required by server 120, thereby freeing up server and network resources and expediting the device migration process.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for device migration in a unified endpoint management system ("UEMS"), comprising:
    establishing a direct connection at a first user device with a second user device;
    receiving device migration user credentials at the second user device, the migration user credentials being based on user input provided at the first user device;
    authenticating the migration by comparing user input at the second user device to the device migration user credentials;
    identifying, to the first user device, the operating system running on the second user device;
    receiving a migration data file at the second user device, the migration data file originating from the first user device; and
    initiating a device migration at the second user device using the migration data file,
    wherein the first user device prompts the user to choose between at least:
        migrating to the second user device and keeping the first user device enrolled the UEMS; and
        migrating to the second user device and unenrolling the first user device from the UEMS, wherein selection of unenrolling the first user device causes the first user device to erase all data files and applications associated with the UEMS.

2. The method of claim 1, wherein in an instance where the first and second user devices are running the same operating system, the method further comprises:
    verifying the integrity of the migration data file;
    applying user profile settings and policies at the second user device;
    retrieving, at the second user device, a software package from the migration data file;
    installing, at the second user device, a software application using the software package;
    copying, at the second user device, data files from the migration data file using the same file structure as the first user device; and
    notifying a UEMS management server of the migration.

3. The method of claim 2, wherein the software application, files, and policies are managed by the UEMS.

4. The method of claim 2, wherein the integrity of the migration data file is verified using an encryption key, a hash, or a cryptographic hash.

5. The method of claim 1, wherein in an instance where the first and second user devices are running different operating systems:
    the migration data file omits at least one application that is managed on the first device as part of the UEMS;
    the device migration comprises installing policies and files from the migration data file at the second user device; and
    the installed files use the same file structure as the first user device.

6. The method of claim 1, wherein the device to device migration is managed by a portal application installed on each of the first and second user devices.

7. A non-transitory, computer-readable medium containing instructions that, when executed by a hardware-based processor, performs stages for device migration in a unified endpoint management system ("UEMS"), the stages comprising:
    establishing a direct connection at a first user device with a second user device;
    receiving device migration user credentials at the second user device, the migration user credentials being based on user input provided at the first user device;
    authenticating the migration by comparing user input at the second user device to the device migration user credentials;
    identifying, to the first user device, the operating system running on the second user device;
    receiving a migration data file at the second user device, the migration data file originating from the first user device; and
    initiating a device migration at the second user device using the migration data file,
    wherein the first user device prompts the user to choose between at least:
        migrating to the second user device and keeping the first user device enrolled the UEMS; and
        migrating to the second user device and unenrolling the first user device from the UEMS, wherein selection of unenrolling the first user device causes the first user device to erase all data files and applications associated with the UEMS.

8. The non-transitory, computer-readable medium of claim 7, wherein in an instance where the first and second user devices are running the same operating system, the method further comprises:
    verifying the integrity of the migration data file;
    applying user profile settings and policies at the second user device;
    retrieving, at the second user device, a software package from the migration data file;
    installing, at the second user device, a software application using the software package;
    copying, at the second user device, data files from the migration data file using the same file structure as the first user device; and
    notifying a UEMS management server of the migration.

9. The non-transitory, computer-readable medium of claim 8, wherein the software application, files, and policies are managed by the UEMS.

10. The non-transitory, computer-readable medium of claim 8, wherein the integrity of the migration data file is verified using an encryption key, a hash, or a cryptographic hash.

11. The non-transitory, computer-readable medium of claim 7, wherein in an instance where the first and second user devices are running different operating systems:
    the migration data file omits at least one application that is managed on the first device as part of the UEMS;

the device migration comprises installing policies and files from the migration data file at the second user device; and the installed files use the same file structure as the first user device.

12. The non-transitory, computer-readable medium of claim 7, wherein the device to device migration is managed by a portal application installed on each of the first and second user devices.

13. A system for device migration in a unified endpoint management system ("UEMS"), comprising:
a memory storage including a non-transitory, computer-readable medium comprising instructions; and
a computing device including a hardware-based processor that executes the instructions to carry out stages comprising:
establishing a direct connection at a first user device with a second user device;
receiving device migration user credentials at the second user device, the migration user credentials being based on user input provided at the first user device;
authenticating the migration by comparing user input at the second user device to the device migration user credentials;
identifying, to the first user device, the operating system running on the second user device;
receiving a migration data file at the second user device, the migration data file originating from the first user device; and
initiating a device migration at the second user device using the migration data file,
wherein the first user device prompts the user to choose between at least:
migrating to the second user device and keeping the first user device enrolled the UEMS; and
migrating to the second user device and unenrolling the first user device from the UEMS, wherein selection of unenrolling the first user device causes the first user device to erase all data files and applications associated with the UEMS.

14. The system of claim 13, wherein in an instance where the first and second user devices are running the same operating system, the method further comprises:
verifying the integrity of the migration data file;
applying user profile settings and policies at the second user device;
retrieving, at the second user device, a software package from the migration data file;
installing, at the second user device, a software application using the software package;
copying, at the second user device, data files from the migration data file using the same file structure as the first user device; and
notifying a UEMS management server of the migration.

15. The system of claim 14, wherein the software application, files, and policies are managed by the UEMS.

16. The system of claim 14, computer-readable medium of claim 7, wherein the integrity of the migration data file is verified using an encryption key, a hash, or a cryptographic hash.

17. The system of claim 13, wherein in the instance where the first and second user devices are running different operating systems:
the migration data file omits at least one application that is managed on the first device as part of the UEMS;
the device migration comprises installing policies and files from the migration data file at the second user device; and
the installed files use the same file structure as the first user device.

* * * * *